United States Patent [19]
Sakumoto et al.
[11] 3,813,057
[45] May 28, 1974

[54] REEL MOUNT ELEVATING MECHANISM

[75] Inventors: Hideki Sakumoto, Hirakata; Yoshiteru Namoto, Moriguchi; Masaharu Ushihara, Katano; Shizuhiko Tanigawa, Moriguchi; Shozo Kanda, Neyagawa, all of Japan

[73] Assignee: Matsushita Electric Industrial Co., Ltd., Osaka, Japan

[22] Filed: Nov. 28, 1972

[21] Appl. No.: 310,003

[30] Foreign Application Priority Data

Dec. 1, 1971 Japan ................................ 46-97378
Dec. 23, 1971 Japan ................................ 47-503

[52] U.S. Cl. ................................ 242/198, 274/4 B
[51] Int. Cl.... G03b 1/04, G11b 15/32, G11b 23/04
[58] Field of Search ........................ 242/197-200; 274/4 B, 4 C, 11 B, 11 C

[56] References Cited

UNITED STATES PATENTS

| | | | |
|---|---|---|---|
| 3,561,767 | 2/1971 | Negishi | 274/4 C |
| 3,620,479 | 11/1971 | Umeda | 242/198 |

*Primary Examiner*—Leonard D. Christian
*Attorney, Agent, or Firm*—Stevens, Davis, Miller & Mosher

[57] ABSTRACT

A reel mount elevating mechanism which is so constructed that an energy for elevating a vertically movable reel mount is accumulated incident to the movement of a cartridge inserted in a direction perpendicular to the direction in which said reel mount is movable, and is released when the cartridge has reached a predetermined position relative to said reel mount, whereby said reel mount is elevated by said energy.

5 Claims, 5 Drawing Figures

REEL MOUNT ELEVATING MECHANISM

This invention relates to a mechanism for the engagement and disengagement between a tape cartridge, with a supply reel disposed therein, and a reel mount, which is used in cartridge type magnetic recording and reproducing apparatus and the like of the type in which said tape cartridge is inserted therein in a direction perpendicular to a reel driving shaft.

In conventional apparatus of the type described, it is necessary, for driving a tape reel disposed in a cartridge, to engage a projection, such as a pin, provided on a reel mount into the axial bore of a reel hub. Therefore, when the cartridge is mounted in the apparatus in a sideward direction with respect to the reel driving shaft as described above, it naturally becomes necessary that the reel mount is rendered movable in a vertical direction and engaged with the cartridge after said cartridge has been mounted in a predetermined position.

In such a construction, the tape reel is rotatable only after the reel mount is elevated and engaged with said tape reel, so that such operations as rewinding of tape is impossible and especially when a one reel-type cartridge is used, forwarding of tape is impossible, unless the tape reel and reel mount are engaged with each other. It is, therefore, undesirable to cause the apparatus to make various operations while the tape reel and reel mount are not in engagement with each other.

The present invention contemplates the provision of a reel mount elevating mechanism which obviates the above disadvantage of the conventional apparatus and which comprises a reel driving shaft having a reel mount fixed to the top end thereof, means for rotatably and axially slidably supporting said reel driving shaft and means for accumulating an energy for elevating said reel driving shaft, incident to the movement of a cartridge inserted in a direction perpendicular to the direction in which said reel driving shaft is movable, whereby said reel driving shaft is elevated by said accumulated energy when the cartridge has been set in a predetermined position relative to said reel mount.

A first object of the invention is to provide a cartridge and reel mount engaging means which operates in association with the movement of a cartridge being inserted and achieves engagement between the cartridge and a reel mount with good timing.

A second object of the invention is to provide a cartridge and reel mount disengaging means which releases the engagement between the cartridge and the reel mount as required and automatically ejects said cartridge toward a cartridge insertion opening.

A third object of the invention is to provide a cartridge and reel mount disengaging means which holds an associated apparatus inoperative against various operations until the engagement between the tape cartridge and reel mount has been positively established.

Other objects and features of the invention will become apparent from the following detailed description on an embodiment thereof taken in conjunction with the accompanying drawings. The drawings show a cartridge type recording and reproducing apparatus embodying the present invention, in which.

Figure 2:
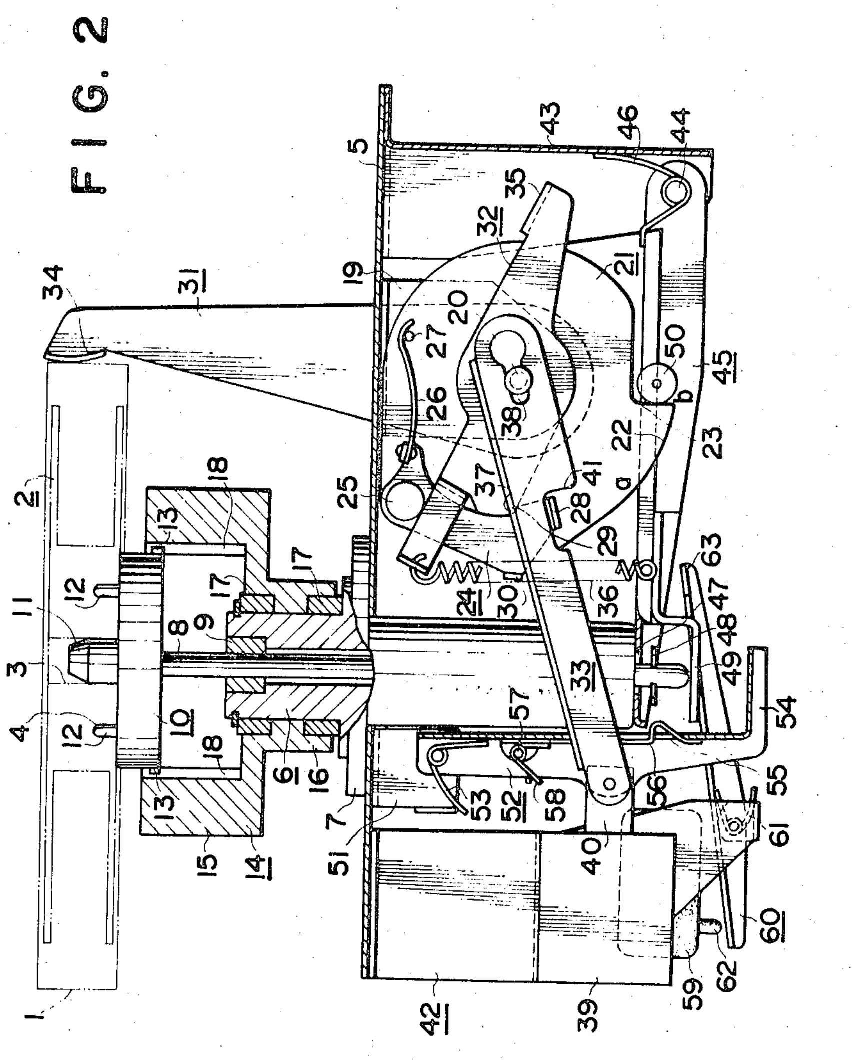
Figure 3:
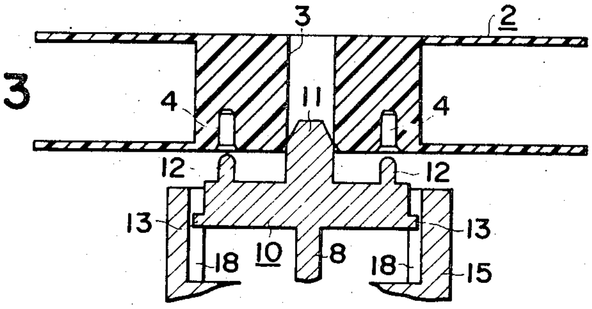
FIG. 3 is a sectional view of the reel mount portion of the apparatus.
Figure 4:
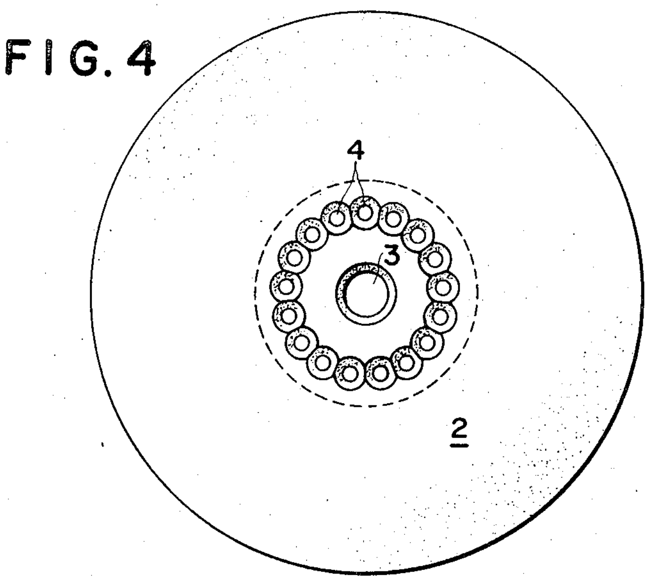
FIG. 4 is a bottom view of the reel mounted on the reel mount.

With reference to the drawings, a tape cartridge 1 is inserted into the apparatus along a guide (not shown) in the direction of the arrow A up to the position shown in FIG. 2. The tape cartridge 1 has a tape reel 2 disposed therein, and a hub of the tape reel 2 is provided with a positioning bore 3 at the center thereof and driving holes 4 around said positioning bore 3, as shown in FIGS. 3 and 4.

An elevating mechanism is supported by a base plate 5 which is fixed to a base plate (not shown) of the magnetic recording and reproducing apparatus after the elevating mechanism has been assembled.

A cylindrical reel driving shaft support 6 is fixed to the base plate 5 at its flanged portion 7.

A reel driving shaft 8 is rotatably and axially slidably extended through the cylindrical support 6 and supported therein by a bearing 9, with predetermined lengths thereof protruding upwardly and downwardly from said cylindrical support. A reel mount 10 is fixed to the top end portion of the reel driving shaft 8 integrally with said reel driving shaft. This reel mount 10 is provided on the upper surface thereof with a positioning pin 11 for engagement with the positioning bore 3 of the reel 2, and also with two driving pins 12, 12 for engagement with the aforesaid driving holes 4 of said reel hub.

Figure 5:
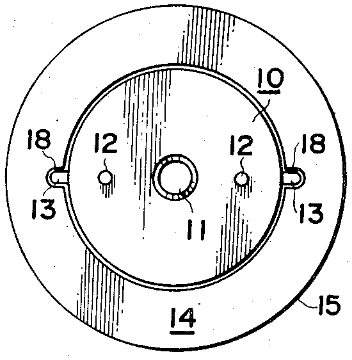
FIG. 5 is a plan view of the reel mount portion of the apparatus.

Further, the reel mount 10 is provided on the peripheral surface thereof with two driving projections 13, 13 in diametrically opposed relation as shown in FIG. 5.

A substantially cylindrical drive transmitting cylinder 14 for driving the reel mount has a large diameter portion 15 and a small diameter portion 16, and is rotatably mounted on the reel driving shaft support 6 at its small diameter portion 16 through bearings 17, 17.

The upper large diameter portion 15 of the drive transmitting cylinder 14 has an inner diameter slightly larger than the outer diameter of the reel mount 10, and the inner peripheral surface thereof is formed with driving grooves 18, 18 in the axial direction at diametrially opposite locations as shown in FIG. 5. The driving projections 13, 13 provided on the reel mount 10 are slidably received in these grooves 18, 18 respectively. Thus, it will be understood that the reel mount 10 is slidable axially but unrotatable with respect to the drive transmitting cylinder 14, and rotates integrally with said drive transmitting cylinder when said transmitting cylinder is driven.

A cam supporting member 19 is fixed to the base plate 5 and a cam 21 is rotatably mounted on said cam supporting member 19 by a pivot pin 20. The cam 21 has a peripheral edge portion a-b of a predetermined radius of curvature which constitutes a roller pressing portion 22, and a step 23 is formed at the counterclockwise end of said edge portion 1—*b*. An engaging member 24 is pivotally mounted at one end on the cam 21 by a pivot pin 25 provided on said cam. A plate spring 26 has one end fixed to the engaging member 24, with the other end hooked on a pin 27 provided on the cam 21, and is urging the engaging member 24 to rotate in a counterclockwise direction about the pivot pin 25. The other end of the engaging member 24, opposite to the pivoted end thereof, is formed with a squarely bent lug 28. The engaging member 24 also has a stepped engaging portion 29 formed centrally of its side edge facing the pivot pin 20 and a stopper projection 30 centrally of the opposite side edge, said stopper projection 30 projecting backwardly of the sheet of the drawing and being in abutting engagement with the outer peripheral edge of the cam 21, limiting the counterclockwise rotation of said engaging member 24 under the biasing force of the plate spring 26.

Also pivotally mounted on the pivot pin 21 are a main lever 31 having one end projecting upwardly from the base plate 5, a tension lever 32 and a strip-like releasing lever 33.

The main lever 31 is connected to the cam 20 integrally therewith and has a pushing bent lug 34 at its outer end for contact with the cartridge 1. The cam 21 and the main lever 31 are urged to rotate in a counterclockwise direction as by a spring not shown.

The rightward end of the tension lever 32 is formed with a bent lug 35 at which the counterclockwise rotation of said tension lever is limited, and the leftward end thereof is divided into two portions, one of which is bent to stride over the engaging member 24 and projecting outwardly of the outer peripheral edge of the cam 21 and has one end of a tension spring 36 anchored thereto. The other portion constitutes an engaging portion 37 for engagement with the engaging portion 29 of the engaging member 24. The releasing lever 33 is formed at one end with a slot 38 and is slidably mounted on the pivot pin 20, with said pivot pin received in said slot 38. The other end of the releasing lever 33 is connected to a plunger 40 of an electromagnet 39. The releasing lever 33 has a step 41 formed centrally thereof at a location opposite to the bent lug 28 of the engaging member 24. The electromagnet 39 is secured to the base plate 5 through a bracket 42.

An elevating arm 45 is pivotally mounted at one end on a bracket 43 by a pivot pin 44, which bracket 43 is fixed to the base plate 5. This elevating arm 45 is urged by a spring 46 to rotate in a counterclockwise direction about the pivot pin 44.

The other end of the elevating arm 45 is provided with an opening 47 and the lower end of the reel driving shaft 8 is extending downwardly through said opening 47. The reel driving shaft 8 is provided at its lower end portion with a stopper ring 48 by which said reel driving shaft 8 is held in engagement with the elevating arm 45.

The other end of the elevating arm 45 also has connected thereto a push-up member 49 which is held in abutting engagement with the lower end of the reel driving shaft 8.

The central portion of the elevating arm 45 is provided with a roller 50 which is in sliding contact with the peripheral edge of the cam 21, and has the other end of the tension spring 36 anchored thereto, which has one end anchored to the other end portion of the tension lever 32 as stated above.

A lock lever 52 is pivotally connected at its upper end to a bracket 51 by a pivot pin 52', which bracket 51 is fixed to the base plate 5. This lock lever is urged by a spring 53 to rotate in a counterclockwise direction about the pivot pin 52'.

The lower end of the lock lever 52 is bent rightwards to constitute a stopper 54 for limiting the downward movement of the elevating arm 45. An opening 55 is formed in the lock lever 52 at a location slightly upwardly of the stopper 54, and a locking member 56 is projecting through said opening 55 towards the reel driving shaft 8. This locking member 56 is pivotally connected to the lock lever 52 by a pivot pin 57 and is urged to rotate in a counterclockwise direction by a spring 58. The portion of the locking member 56 projecting through the opening 55 has a chevron shape, with the upper side of said chevron shaped portion extending at right angles to the remaining portion of said locking member, so as to lock the elevating arm 45 at said upper side.

The central portion of the lock lever 52 is connected to the plunger 40 of the electromagnet 39, together with the releasing lever 33.

A main switch 59 of the magnetic recording and reproducing apparatus is fixedly mounted on an extension of the electromagnet supporting bracket 42 and a switch operating lever 60 is pivotally connected at its central portion to the lower end portion of said extension, said switch operating lever 60 being urged to rotate in a counterclockwise direction by a spring 61. The leftward end of the switch operating lever 60 is opposed by a push-button 62 of the main switch 59, while the rightward end thereof is formed with a bent lug 63 which is opposed by the lower edge of the elevating arm 45.

Now, the operation of the reel mount elevating mechanism constructed as described above will be explained.

Figure 1:
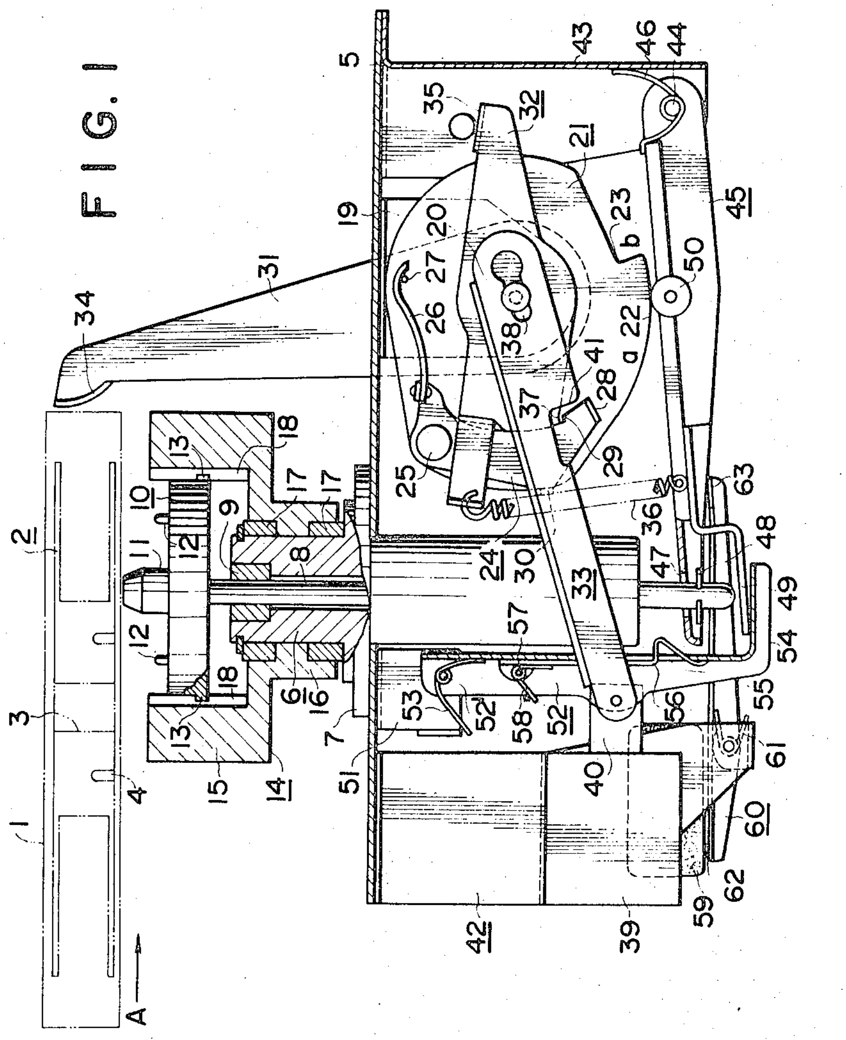
FIGS. 1 and 2 are partially broken away side views for explaining the construction and operation of the apparatus.

FIG. 1 shows the state in which the tape cartridge 1 is inserted to a position to abut against the pushing lug 34 of the main lever 31 and the reel mount elevating mechanism yet remains in the position before the cartridge is inserted. Namely, the elevating arm 45 is in abutting engagement with the stopper portion 54 of the lock lever 52 and hence the reel driving shaft 8 and reel mount 10 are in their lowered positions, providing for further insertion of the cartridge 1 without being interfered by the positioning pin 11, etc. provided on the reel mount 10.

Further, in this position of the mechanism, the switch operating lever 60 is being depressed by the elevating arm 45 at the bent lug 63 at the rightward end thereof, so that the main switch 59 is held in an open position, with the push-button 62 being pushed by the leftward end of said switch operating lever 60. Therefore, the magnetic recording and reproducing apparatus is inoperable in this state. The tension spring 36 is in its relaxed state with no tension therein.

As the cartridge 1 is forced further into the apparatus from this state, the main lever 31 is caused by the cartridge to make a pivotal movement in a clockwise direction and the cam 21 integral with said main lever 31 starts to rotate in a clockwise direction about the pivot pin 20, so that the engaging member 24 mounted on said cam 21 engages the tension lever 32 at the engaging portion 29, causing said tension lever 32 to make a pivotal movement in a clockwise direction along with the cam 21.

The tension lever 32 incident to its pivotal movement pulls the tension spring 36 upward at its leftward end, so that said tension spring urges the elevating arm 45, connected to the lower end thereof, to make a pivotal movement in a clockwise direction about the pivot pin 44. However, the elevating arm 45 does not immediately make a pivotal movement as the roller 50 provided thereon is being restrained by the roller pressing portion 22 of the cam 21. In the meantime, the cartridge 1 is fully inserted into the apparatus and the step 23 of the cam 21 is shifted to the position of the roller 50 through the main lever 31 as shown in FIG. 2, whereupon the roller 50 falls in the step-forming notch and the elevating arm 45 is only then allowed to make a pivotal movement upwardly, abruptly pushing the reel driving shaft 8 upwardly by the push-up member 49 connected to said elevating arm.

In this case, the positioning bore 3 of the tape cartridge 1 is located just opposite the positioning pin 11 on the reel mount 10. Therefore, when the reel driving shaft 8 is pushed up, the positioning pin 11 is received in the positioning bore 3 as shown in FIG. 3 and thus the reel 2 is positioned preliminarily relative to the reel mount 10. Thereafter, the driving pins 12 are engaged in the respective driving holes 4. In this case, the driving pins 12 are each received in any one of the driving holes 4 which are provided in a large number and arranged in a circular shape in adjoining relation to each other as shown in FIG. 4.

FIG. 2 shows the state of the mechanism after completion of engagement between the reel 2 and the reel mount 10. The elevating arm 45 is locked in the position shown by the locking member 56 of the lock lever 52. During the upward movement, the push-up member 49 provided at the free end of the elevating arm 45 pushes the locking member 56 leftwards, but the lock lever 52 is held immovably because said locking member 56 is pivotable independently of said lock lever 52.

As may be apparent from FIG. 2, the upward pivotal movement of the elevating arm 45 results in a counterclockwise pivotal movement of the switch operating lever 60 under the biasing force of the spring 61, because the rightward end 63 of said switch operating lever is released from restrainment by said elevating arm. As a result, the pressure is removed from the push-button 62 of the main switch 59 and said main switch is shifted to a closed position, rendering the magnetic recording and reproducing apparatus operable.

When the drive transmitting cylinder 14 is driven in this state, the reel mount 10 is driven through the engagement between the driving grooves 18 and the driving projections 13, and thus the reel 2 is driven.

When it is desired to demount the cartridge 1 from the state shown in FIG. 2, this is achieved in the following manner:

Namely, in this case, the electromagnet 39 is energized, whereupon the rock lever 52 is caused to make a pivotal movement in a clockwise direction and the releasing lever 33 is also shifted leftwards by the plunger 40, so that first of all, the engaging member 24 is caused to make a pivotal movement in a clockwise direction about the pivot pin 25 against the biasing force of the plate spring 26 through the engagement between the step 41 of the releasing lever 33 and the bent lug 28 of said engaging member 24, and thereby the engagement between the engaging portion 29 of said engaging member 24 and the engaging portion 37 of the tension lever 32 is released. The tension spring 36 causes the tension lever 32 to make a pivotal movement in a counterclockwise direction and then is relaxed.

The clockwise pivotal movement of the lock lever 52 in this state releases locking of the elevating arm 45 by the locking member 56 and the elevating arm 45 pivotally moves downward under the biasing force of the spring 46 until the push-up member 49 abuts against the stopper 54 of the lock lever 52. Therefore, the reel driving shaft 8 is pulled downward through the stopper ring 48 and thus, the engagement between the reel mount 10 and the reel 2 is released.

At the same time, the step 23 of the cam 21 is released from engagement by the roller 50, so that said cam 21 makes a pivotal movement in a counterclockwise direction under the biasing force of the spring (not shown) to the position shown in FIG. 1. The electromagnet 39 is deenergized after completion of the above-described operation. Incident to the pivotal movement of the cam 21, the main lever 31 integral with said cam also makes a pivotal movement in a counterclockwise direction, pushing the tape cartridge 1 to the position shown in FIG. 1 by its bent lug 34.

On the other hand, the elevating arm 45 during its downward pivotal movement depresses the bent lug 63 of the switch operating lever 60, so that the pushbutton 62 is pushed in by the leftward end of said switch operating lever 60 and thus, the main switch 59 is opened.

As described above, the reel mount elevating mechanism according to the invention operates in association with the movement of the tape cartridge being inserted and elevates the reel mount instantaneously when the tape cartridge has been set in position, and therefore, is highly effective fo the automatization of the tape cartridge mounting operation.

With the mechanism of the invention, demounting of the tape cartridge is also facilitated because the tape cartridge is automatically ejected towards the cartridge insertion opening upon disengagement of the reel mount from the tape reel.

Further, with the mechanism of the invention, as may be apparent from the foregoing description, the main switch 59 will not be closed unless the reel mount 10 is elevated, and the reel mount 10 will not be movable upwardly unless the positioning pin 11 and driving pins 12 on the reel mount 10 are engaged in the positioning bore 3 and driving holes 4 of the tape reel, even when the tape cartridge 1 is inserted. Further, the reel mount 10 will not move upwardly until the tape cartridge 1 is fully inserted, because the upward movement of said reel mount is associated with the insertion of the tape cartridge. Therefore, the main switch 59 is closed only after the tape cartridge has been fully inserted, with the tape reel 2 being engaged by the reel mount 10. Furthermore, since the upward movement of the reel mount 10 takes place instantaneously, in no case will the main switch 59 be closed while the engagement between the tape reel 2 and reel mount 10 is imcomplete and, therefore, the apparatus will not perform various operations, such as recording and reproduction, other than when the reel mount is engaged completely with the tape reel. This is advantageous in ensuring safe operation of the apparatus.

Alhough in the embodiment described and illustrated herein an arrangement is made such that the main switch 59 is opened and closed in association with the vertical movement of the reel mount 10, it will be obviously understood that any other switch may be provided in the place of the main switch, e.g. a switch which controls only forwardly of the tape.

What is claimed is:

1. A reel mount elevating mechanism comprising a reel driving shaft having a reel mount fixed to the top end thereof, means for rotatably and axially slidably supporting said reel driving shaft, an elevating arm having one end engaged with the lower end portion of said reel driving shaft in such a manner as will not interfere with rotation of said reel driving shaft and pivotally supported at the other end so that said one end may be movable in the axial direction of said reel driving shaft, biasing means for urging said reel driving shaft to move slidingly downwardly, a rotatable cam plate having at the peripheral edge a sliding portion consisting of an arcuate portion and a notched portion and being in abutting engagement with said elevating arm at said sliding portion, transmitting means engaged by a cartridge being inserted and transmitting the movement of said cartridge to said cam plate as rotational force, a tension lever, an engaging member pivotally mounted on said cam plate, said tension lever being releasably engaged with said engaging member and rotatable together with said cam plate, a tension spring connecting said tension lever and said elevating arm with each other and urging said elevating arm to make a pivotal movement against said biasing means incident to rotation of said tension lever, and a releasing lever for releasing the engagement between said tension lever and said engaging member.

2. A reel mount elevating mechanism according to claim 1, wherein there is provided locking means which is releasably engaged with one end of said elevating arm for holding said elevating arm in its reel driving shaft elevating position.

3. A reel mount elevating mechanism according to claim 2, wherein means for releasing the engagement of said locking means with said elevating arm is operatively associated with said releasing lever.

4. A reel mount elevating machinism according to claim 1, wherein a switch for controlling the operation of an associated apparatus is opened or closed in association with the vertical movement of said reel driving shaft.

5. A reel mount elevating mechanism according to claim 1, wherein said cam plate is imparted with a biasing force just enough to eject the inserted cartridge through said transmitting means.

* * * * *